Feb. 1, 1949.  C. A. OLIVEROS  2,460,527
WIND PUMP FOR AERATING BAIT CONTAINERS
Filed Jan. 13, 1945  2 Sheets-Sheet 1
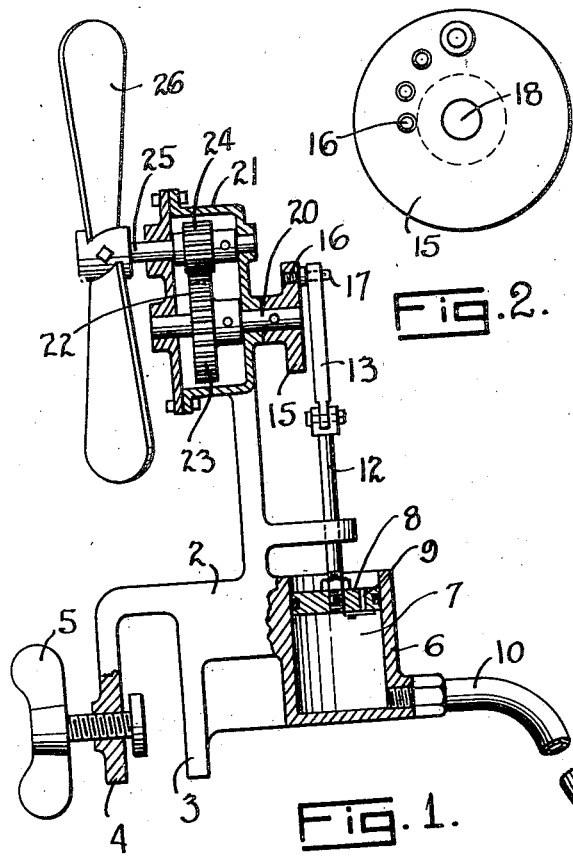
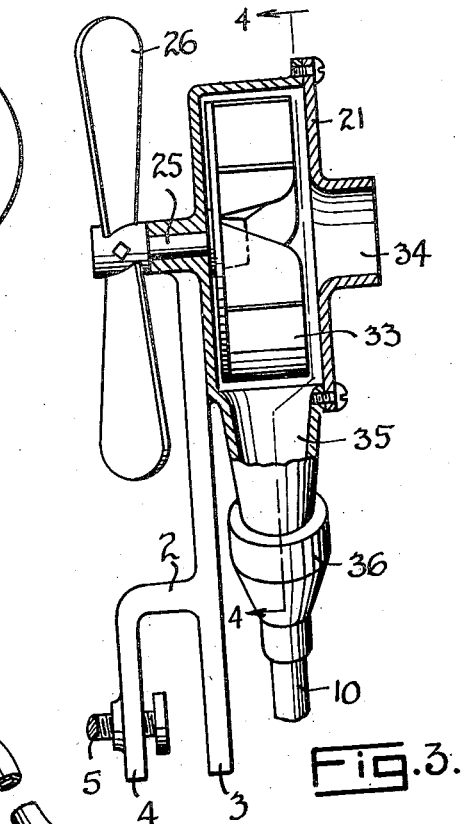
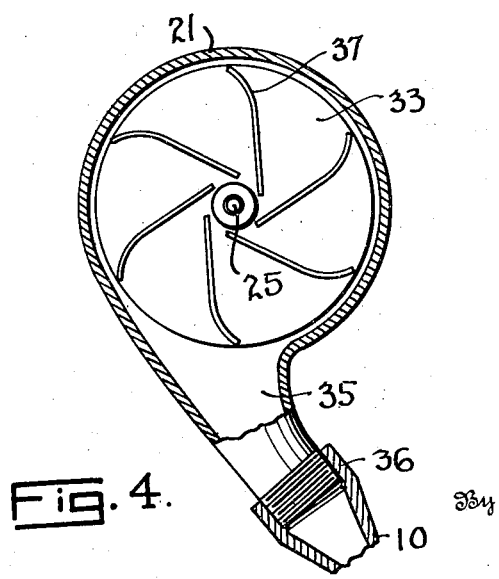
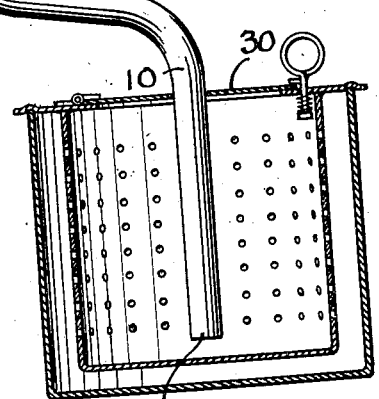
Inventor
C. A. OLIVEROS.
Lester B. Clark.
+ Ray L. Smith
Attorneys

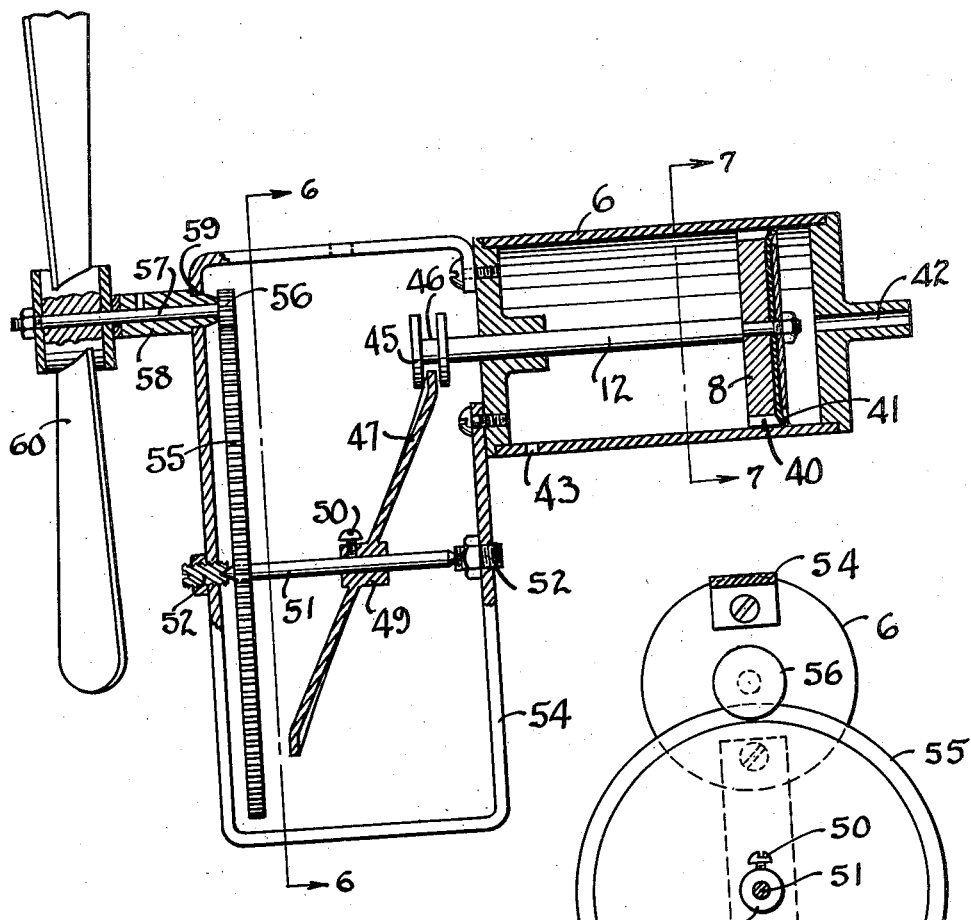

Patented Feb. 1, 1949

2,460,527

UNITED STATES PATENT OFFICE 2,460,527

WIND PUMP FOR AERATING BAIT CONTAINERS

Constant A. Oliveros, Houston, Tex.

Application January 13, 1945, Serial No. 572,704

1 Claim. (Cl. 261—30)

The invention relates to an aerating device for live bait containers.

In transporting live bait and maintaining such bait alive prior to its use, it is imperative that the water in the container be almost constantly aerated.

The present device contemplates the positive forcing of air into the water in the container at a predetermined rate so that it is positively known that the water is being aerated.

Another object of the invention is to provide a device for aerating live bait containers which can be readily attached to a supporting structure, such as a portion of an automobile, boat, pier, or dock so that a wind wheel thereon may be turned by the flow of air, thereby to force air into the live bait container.

Another object of the invention is to provide a positive displacement pump operated by a wind wheel to force air into a live bait container.

Still another object of the invention is to provide an impeller operated by a wind wheel for forcing air into a live bait container.

Other and further objects of the invention will be readily apparent when the following description is considered in connection with the accompanying drawing, wherein:

Fig. 1 is a diagrammatic view with certain parts in section showing the general combination of the device wherein a positive displacement pump is illustrated;

Fig. 2 is a side elevation of the pitman rod eccentric for adjusting the length of the pump stroke;

Fig. 3 is an edge elevation, with certain parts in section, of an impeller type of pump;

Fig. 4 is a section taken on the line 4—4 of Fig. 3;

Fig. 5 is a vertical sectional view of a modified form of the displacement pump;

Fig. 6 is a section on the line 6—6 of Fig. 5; and

Fig. 7 is a section on the line 7—7 of Fig. 5.

At the present day it is not uncommon at all for fishermen to obtain live bait at a source a considerable distance from the fishing grounds and the live bait must be transported usually by automobile or boat to the location where it is to be used, and the present device is intended for use in connection with the live bait container so as to aerate the container. The device, as shown in Fig. 1, includes a frame or body 2 which may be of any desired shape or configuration, but preferably has a clamping device illustrated by the legs 3 and 4 which are spaced apart to straddle a supporting structure such as the bumper, window, or other portion of an automobile, boat or pier. The device will be rigidly supported in this manner and may be clamped in place by the screw 5.

The frame or body 2, as illustrated in Fig. 1, has the body 6 which is made up of the cylinder 7 and the piston 8 working in the cylinder. A check valve 9 permits the flow of air into the chamber 7 on the upstroke and forces the air from the chamber through the discharge conduit 10 on the downstroke. The piston 8 is operated by the piston rod 12 and the pitman rod 13 connected thereto. The pitman rod is in turn connected to the disc 15 having a plurality of eccentric openings 16 therein which receive the bolt 17 for supporting the pitman rod 13. A plurality of these openings 16 are illustrated in Fig. 2 at varying distances from the center 18 of the disc so that connection to different holes will give a different length of stroke for the pump.

The disc 15 is mounted on the rotatable shaft 20 carried by the head 21 of the frame 2. A gear train 22 is mounted in the head and includes the drive gear 23 on the shaft 20 and the drive gear 24 on the shaft 25. While a gear train has been shown, it is obvious that a belt and pulley arrangement or any other suitable type of power transmission could be substituted therefor.

A wind wheel or propeller 26 is removably connected to the shaft 25 and it is understood that any size propeller may be used. It seems clear that as the propeller is driven by a flow of air passing thereby, it will reciprocate the piston 8 to force air through the conduit 10.

It seems obvious that if the device is to be attached to an automobile driven at a relatively high speed, the device may be adjusted by positioning the pitman rod in one of the openings where the stroke will be rather short or by providing a small propeller on the shaft 25. While on the other hand, if the device is to be supported upon a pier or dock or a slowly moving boat where there may be a slight flow of air thereby, it may be desirable to either provide a larger propeller 26 or to place the pitman connection in one of the other openings 16 so as to obtain a longer stroke. It seems clear that the device may be adjusted in this manner to obtain a predetermined or the desired flow of air into the conduit 10.

The conduit 10 is preferably in the form of a hose which may be extended into the bait container 30 and have its lower end 31 projecting beneath the water level so that air would be discharged into the water. This flow of air tends to circulate the water and to aerate it so as to keep the bait alive.

The invention may take the form of Figs. 3 and 4 wherein the shaft 25 carrying the propeller 26 has an impeller wheel 33 therein and wherein the head 21 is modified somewhat to provide an air inlet 34 and an air discharge 35 so that the conduit 10 is connected by the coupling 36 directly to this outlet 35.

The impeller 33 will have the blades 37 thereon, as illustrated in Fig. 4, so that the air drawn in through the suction inlet 34 will be discharged in a radial direction through the ports. The clamp or supporting structure is the same as previously described.

Figs. 5 to 7 inclusive show a somewhat modified form of the invention wherein the pump cylinder 6 is arranged in a horizontal position with the piston 8 reciprocating therein to perform the pumping action. The piston 8 is arranged with recesses 40 in its periphery, so as to provide a passage 40 for the air or the suction stroke to pass the flexible sealing member 41. In this manner a flow of air will be insured through the outlet 42, to which the hose 16 of Fig. 1 may be connected.

A port 43 in the cylinder allows for the inlet of air.

In order to reciprocate the piston rod 12, a head 45 has been arranged thereon which has a channel 46 therein to receive the periphery of a wobble plate 47. This plate has a hub 49 affixed with the set screw 50 to the shaft 51. This shaft is mounted in adjustable bearings 52 carried by either side of a frame or housing 54. The shaft 51 is rotatable by a driven gear 55 which meshes with a pinion 56 on the shaft 57 mounted in the bushing 58, which is in turn affixed at 59 in the edge of the housing. The wind or propeller wheel 60 is also affixed to this shaft 57 so that it seems obvious that as the propeller 60 is rotated it will cause the plate 47 to rotate, and in view of the fact that this plate is inclined relative to the axis of the shaft 51 the plate will be caused to wobble and in turn reciprocate the rod 12.

The operation of the mechanism will be the same as that of Fig. 1 and the device may be attached upon the support structure in any desired manner.

Broadly, the invention contemplates an attachment which may be applied to any live bait container and which will operate to provide a positive flow of air to the live bait.

What is claimed is:

An aerating device for use in connection with live bait liquid containers comprising a frame of sheet metal having opposite walls, a reciprocating positive displacement airpump including a piston and a piston rod extending to within said frame, a channeled head on said piston rod within said frame, a pair of aligned shaft bearings adjustably secured in said opposite walls of said frame, a shaft journaled in said bearings, a wobble plate having a central apertured hub mounted on said shaft, set screw means securing said wobble plate to said shaft for rotation therewith, the periphery of said wobble plate extending into said channeled head of said piston rod, a large gear mounted on said shaft within said frame, a bushing affixed through one wall of said frame, a shaft rotatably extending through said bushing, a pinion gear affixed on said latter shaft and in mesh with said large gear, a windwheel removably secured to said pinion gear shaft without said frame, and an air conduit for conducting air from said pump to inside the liquid container, whereby rotation of said windwheel rotates said gears to rotate said wobble plate to reciprocate said airpump piston to positively pump air through said conduit to the live bait liquid container.

CONSTANT A. OLIVEROS.

REFERENCES CITED

The following references are of record in the file of this patent:

UNITED STATES PATENTS

| Number | Name | Date |
|---|---|---|
| 1,181,886 | High | May 2, 1916 |
| 1,991,149 | Haislip | Feb. 12, 1935 |
| 2,172,799 | Magnus | Sept. 12, 1939 |
| 2,189,391 | Bowdish | Feb. 6, 1940 |
| 2,261,830 | Ditner | Nov. 4, 1941 |